(12) United States Patent
Chen

(10) Patent No.: US 7,552,100 B2
(45) Date of Patent: Jun. 23, 2009

(54) LOAD PREDICTION BASED ON-LINE AND OFF-LINE TRAINING OF NEURAL NETWORKS

(75) Inventor: Dingguo Chen, Eden Prairie, MN (US)

(73) Assignee: Siemens Energy, Inc., Orlando, FL (US)

( * ) Notice: Subject to any disclaimer, the term of this patent is extended or adjusted under 35 U.S.C. 154(b) by 399 days.

(21) Appl. No.: 11/495,482

(22) Filed: Jul. 28, 2006

(65) Prior Publication Data
US 2007/0185823 A1    Aug. 9, 2007

Related U.S. Application Data

(60) Provisional application No. 60/703,803, filed on Jul. 29, 2005, provisional application No. 60/703,082, filed on Jul. 28, 2005, provisional application No. 60/703,081, filed on Jul. 28, 2005.

(51) Int. Cl.
*G06G 7/63* (2006.01)
(52) U.S. Cl. .......................................... 706/21; 706/26
(58) Field of Classification Search ................... 706/12, 706/15–21, 26; 702/57–60, 127, 160; 703/2–5, 703/13–18
See application file for complete search history.

(56) References Cited

U.S. PATENT DOCUMENTS

| 5,311,421 | A  | * | 5/1994 | Nomura et al. ............... 700/37 |
| 5,444,820 | A  |   | 8/1995 | Tzes et al. |
| 7,013,227 | B2 | * | 3/2006 | Harley et al. .................. 702/60 |
| 7,058,522 | B2 | * | 6/2006 | Chen ........................... 702/60 |
| 2004/0246643 | A1 | * | 12/2004 | Chen ........................... 361/115 |
| 2004/0260489 | A1 | * | 12/2004 | Mansingh et al. ............. 702/60 |
| 2005/0192915 | A1 | * | 9/2005 | Ahmed et al. ................. 706/21 |
| 2006/0173640 | A1 | * | 8/2006 | Harley et al. .................. 702/57 |

FOREIGN PATENT DOCUMENTS

| EP | 1 478 075 A2 | 11/2004 |
| WO | WO 92/02867 A1 | 2/1992 |
| WO | WO 01/69329 A2 | 9/2001 |

\* cited by examiner

*Primary Examiner*—David R Vincent
*Assistant Examiner*—Omar F Fernandez Rivas

(57) ABSTRACT

A method and system is provided for predicting loads within a power system through the training of on-line and an off-line neural networks. Load data and load increments are used with an on-line load prediction scheme to generate predicted load values to optimize power generation and minimize costs. This objective is achieved by employing a method and system which predicts short term load trends through the use of historical load data and short term load forecast data.

21 Claims, 4 Drawing Sheets

LOAD PREDICTION BASED ON-LINE AND OFF-LINE TRAINING OF NEURAL NETWORKS

CROSS-REFERENCE TO RELATED APPLICATIONS

This application claims the benefit of U.S. Provisional Applications Nos. 60/703,803 filed Jul. 29, 2005, 60/703,082, 60/703,801 filed on Jul. 28, 2005.

FIELD OF THE INVENTION

The present invention relates to method and system for predicting short term load trends through the use of historical load data and short term load forecast data. Neural Networks are used to analyze load data and trends for an interval of time. Patterns within certain months, weeks, days, hours are analyzed and neural network techniques are applied to predict very short term load forecasts.

BACKGROUND OF THE INVENTION

In the advent of deregulation, load forecasting has taken center stage in providing a means of scheduling energy generation in a marketplace where energy demand may at times appear random. System operators, market operators, transmission owners, and other power industry participants all require a forecasting system and methodology which is fast and accurate in order to operate a reliable system and to remain profitable. Accordingly, forecasting is a necessity in a free market.

However, the restructuring of the power industry from a regulated monopoly to a free market system in which transmission operators are required to operate under regulatory scrutiny has further added a level of complexity in meeting energy demands. Often the manner in which market participants are required to operate is in direct conflict with technical and economic constraints. These constraints are imposed by regulatory agencies, economic concerns, and equipment performance limitations.

At the moment, operators provide regulatory agencies with schedule information detailing the quantity of energy and the time that energy will be produced. These schedules of energy vary over the course of a year, month, week, day, hour and other intervals of time such as seasons and special days such as holidays and weekends. Despite knowing that such energy requirements vary considerably at times, operators are often tasked with the burden of meeting demand for real-time and unanticipated shortage in energy. Meeting these unanticipated demands is often the cause of increased energy costs. Alternatively, decreases in energy costs may be the result of having to provide less energy when a glut of unanticipated energy exists in the marketplace.

As readily apparent, there is a significant need for a method and system which optimizes the performance of a power system performance by predicting in the short term the expect energy demand. The present invention is a solution to the needs of energy producers which must control their production capacity to meet regulatory requirements and to minimize costs and optimize profitability by utilizing field data, historical load and forecast data as well forecasts from other forecasting techniques.

SUMMARY OF THE INVENTION

The present invention is intended to provide a method and system by which energy producers are able to optimize power generation and minimize costs. This objective is achieved by employing a method and system which predicts short term load trends through the use of historical load data and short term load forecast data. Demand patterns are analyzed and used to train neural networks to predict energy demands. The load increments are used in off-line neural network training and on-line prediction. An algorithm is used for load predictions and another algorithm is used for On-line training. Moreover, on-line and off-line training are used to make load predictions. The present invention makes use of on-line neural network training, and integrates the prediction process based on the online trained neural networks and the prediction process based on the offline trained neural networks, thereby providing a mechanism to allow system operators to choose either the online neural network training based load prediction scheme, or the offline neural network training based load prediction scheme, or a careful combination of the predictions from both the online and offline neural network training based load prediction schemes. The online neural network training captures the latest load pattern changes (not seen in offline neural network training) and incorporates such changes into load prediction, thus providing a mechanism to improve the prediction accuracy from the offline neural network training based load prediction.

BRIEF DESCRIPTION OF THE DRAWINGS

A wide variety of potential embodiments will be more readily understood through the following detailed description, with reference to the accompanying drawings in which.

DETAILED DESCRIPTION

Figure 1:
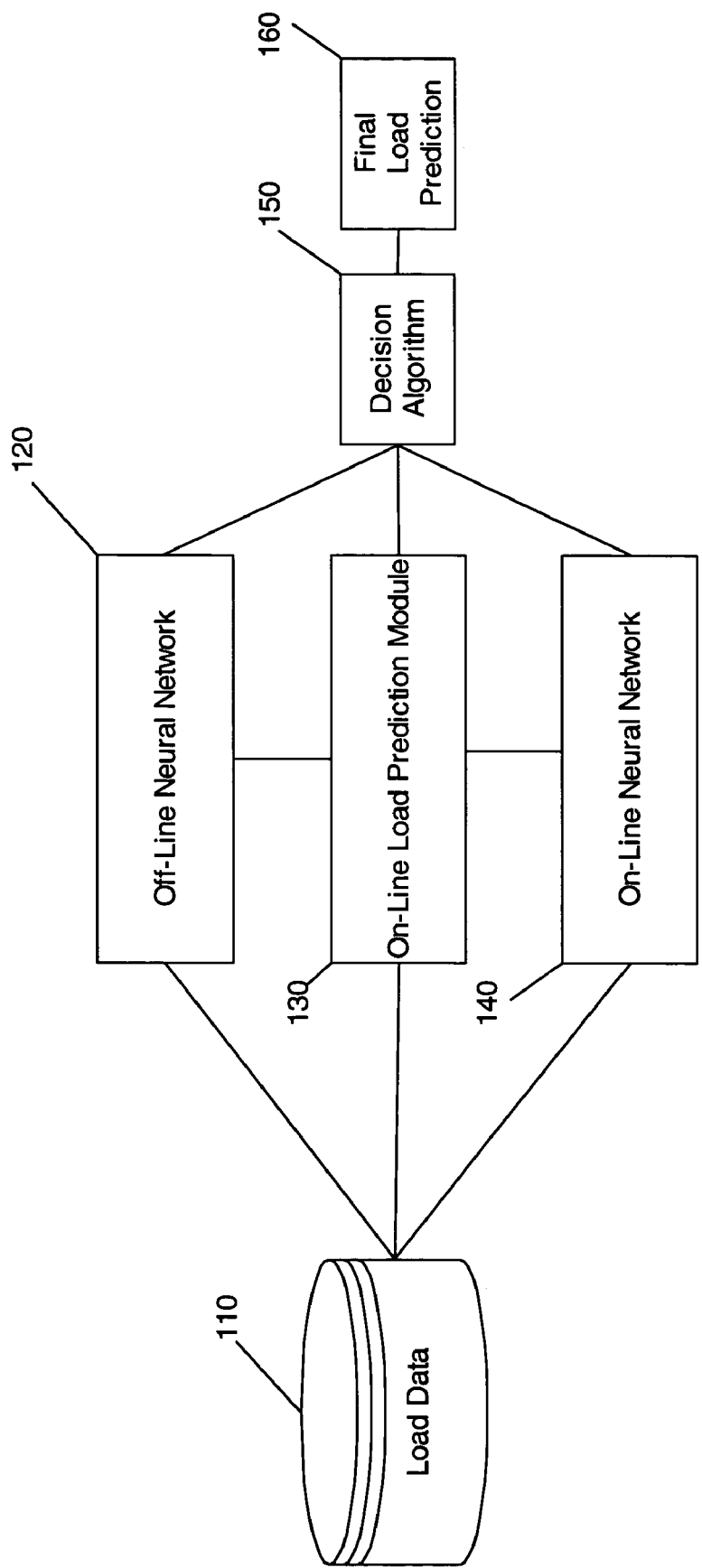
FIG. 1 is a graphical representation of an energy management system incorporating the use of the present invention.

Shown in FIG. 1 is an overview of a portion of an energy management system incorporating the use of the present invention. Load data 110 contains current and historical load data as captured from the field. In order to predict load values based on the training of off-line neural network 120 and on-line neural network 140, load data 110 is provided to both the on-line and off-line neural networks 140 120. An on-line load prediction module is used along with the load data to train both neural networks. Based on the accuracy of the load predictions or other decision based criteria, a prediction scheme based on decision algorithm 150 is adopted to generate a final load prediction 160.

The architecture and operation of an energy management system and in particular the hardware, control modules, neural networks, short term load forecast modules and other related components are described in greater detail in co-pending U.S. patent application Ser. No. 10/844,137 filed May 12, 2004, entitled "Very Short Term Load Prediction in an Energy Management System" and is incorporated herein by reference.

The above methodology utilizes conventional processing software and equipment. An energy management application stored on a storage media containing the above referenced functions may be used with a system processor, internal and/or external memory, including counters, and registers, and real time or nearly real time operating systems. The components and steps depicted in FIGS. 1-4 may be stored in a computer readable media for use in an energy management system. The load prediction process of the present invention is detailed below.

For load prediction purpose, assume that a dynamic load model exists in the context of automatic generation control, and may be expressed in the following form:

$$g(P^{(N)}, \ldots, \dot{P}, P, t) = 0 \qquad (1)$$

where N denotes the order of load dynamics, P the load, and t the time.

For the discrete case, $$h(P_{n-N}, \ldots, P_{n-1}, P_n, n) = 0 \qquad (2)$$

Assume that a continuous mapping from $(P_{n-1}, P_{n-2}, \ldots, P_{n-N}, n)$ to $P_n$ exists. Then $$P_n = f(P_{n-1}, P_{n-2}, \ldots, P_{n-N}, n) \qquad (3)$$

where function $f$ may be viewed as the inverse of function h.

As such, $P_{n+1}, P_{n+2}, \ldots, P_{n+M}$ (M is an arbitrary positive integer) can be obtained in terms of $P_n, P_{n-1}, \ldots, P_{n-N+1}$, n in the following:

$$P_{n+1} = f(P_n, P_{n-1}, \ldots, P_{n-N+1}, n+1) = f_1(P_n, P_{n-1}, \ldots, P_{n-N+1}, n)$$

$$P_{n+2} = f(P_{n+1}, P_n, \ldots, P_{n-N+2}, n+2) = f(f_1(P_n, P_{n-1}, \ldots, P_{n-N+1}, n), P_n, \ldots, P_{n-N+2}, n+2) = f_2(P_n, P_{n-1}, \ldots, P_{n-N+1}, n)$$

$$\ldots$$

$$P_{n+M} = f(P_{n+M-1}, P_{n+M-2}, \ldots, P_{n-N+M-1}, n+M) = f(f_{M-1}, f_{M-2}, \ldots, f_1, \ldots, n+2) = f_M(P_n, P_{n-1}, \ldots, P_{n-N+1}, n) \qquad (4)$$

The load prediction model can now be established as follows:

$$\hat{P}_{n+i} = f_i(P_n, P_{n-1}, \ldots, P_{n-N+1}, n) \qquad (5)$$

where $\hat{P}_{n+i} (1 \leq i \leq M)$ is the predicted load for the future ith step from current time n.

$P_n, P_{n-1}, \ldots, P_{n-N+1}$ are the actual load values for current time and the previous (N-1) time steps.

Define $\Delta P_n = P_{n+1} - P_n$. Then $P_{n+1} = P_n + \Delta P_n$, $P_{n+2} = P_{n+1} + \Delta P_{n+1} = P_n + \Delta P_n + \Delta P_{n+1} = P_n + \Sigma_{k=n}^{n+1} P_k$. Similarly, $P_{n+i} = P_n + \Sigma_{k=n}^{n+i-1} P_k$. Substitution of $P_n = P_{n-N+1} + \Sigma_{k=n-N+1}^{n-1} P_k$ yields $P_{n+i} = P_{n-N+1} + \Sigma_{k=n-N+1}^{n+i-1} P_k$.

As such, the above load prediction model can be rewritten in terms of $\Delta P_k$.

$$P_{n+i} = f_i(P_{n-N+1} + \Sigma_{k=n-N+1}^{n-1} \Delta P_k, P_{n-N+1} + \Sigma_{k=n-N+1}^{n-1} \Delta P_k, \ldots, P_{n-N+1}, n) = g_i(P_{n-N+1}, \Delta P_{n-N+1}, \ldots, \Delta P_{n-1}, n)$$

The choice of N, however, depends on the complexity of load dynamics, and may be determined through a trial-and-error experimental approach along with any available a priori information on load dynamics. It is reasonable, though, that N may be assigned a value of 12, which is compatible with the requirement of the 120 minutes prediction time horizon and 5-minute time step in the ISO energy market application. With this choice, the load predictions can be made for the next 60 minutes using load values for the previous 60 minutes; the load predictions for the following 60 minutes can be made using the just obtained load predictions for the next 60 minutes, thus achieving two hours of load prediction horizon in 5 minute time intervals.

It is observed that in the above equation, the load dynamics are time varying. However, the time varying effect may be neglected within any of the individual time periods that are properly segmented within a whole day and cover a fewer hours each. In other words, load dynamics are considered in such a way that they vary from one individual time period to another while being time independent for individual time period. This is approximately true on the basis of the observations from load shapes recorded in various power utilities.

Accordingly, the load prediction model for its own effective time period can be simplified as follows:

$$P_{n+i} = g_i(P_{n-N+1}, \Delta P_{n-N+1}, \ldots, \Delta P_{n-1})$$

where $1 \leq i \leq M$.

It follows that $$\Delta P_{n+i-1} = g_i(P_{n-N+1}, \Delta P_{n-N+1}, \ldots, \Delta P_{n-1}) - (P_{n-N+1} + \Sigma_{k=n-N+1}^{n+i-2} \Delta P_k)$$

Define $$\psi_1(P_{n-N+1}, \Delta P_{n-N+1}, \ldots, \Delta P_{n-1}) = g_1(P_{n-N+1}, \Delta P_{n-N+1}, \ldots, \Delta P_{n-1}) - (P_{n-N+1} + \Sigma_{k=n-N+1}^{n-1} \Delta P_k)$$

Then the following equation holds for i=1:

$$\Delta P_{n-i+1} = \psi_i(P_{n-N+1}, \Delta P_{n-N+1}, \ldots, \Delta P_{n-1})$$

For i=2, we have $$\Delta P_{n+1} = g_2(P_{n-N+1}, \Delta P_{n-N+1}, \ldots, \Delta P_{n-1}) - (P_{n-N+1} + \Sigma_{k=n-N+1}^{n} \Delta P_k) = g_2(P_{n-N+1}, \Delta P_{n-N+1}, \ldots, \Delta P_{n-1}) - (P_{n-N+1} + \Sigma_{k=n-N+1}^{n} \Delta P_k) - \Delta P_n = g_2(P_{n-N+1}, \Delta P_{n-N+1}, \ldots, \Delta P_{n-1}) - (P_{n-N+1} + \Sigma_{k=n-N+1}^{n} \Delta P_k) - \psi_1(P_{n-N+1}, \Delta P_{n-N+1}, \ldots, \Delta P_{n-1})$$

Define $$\psi_2(P_{n-N+1}, \Delta P_{n-N+1}, \ldots, \Delta P_{n-1}) = g_2(P_{n-N+1}, \Delta P_{n-N+1}, \ldots, \Delta P_{n-1}) - (P_{n-N+1} + \Sigma_{k=n-N+1}^{n} \Delta P_k) - \psi_1(P_{n-N+1}, \Delta P_{n-N+1}, \ldots, \Delta P_{n-1})$$

Then the following equation holds for i=2:

$$\Delta P_{n-i+1} = \psi_i(P_{n-N+1}, \Delta P_{n-N+1}, \ldots, \Delta P_{n-1})$$

By repeating the above procedures and defining appropriate functions $\psi_1(P_{n-N+1}, \Delta P_{n-N+1}, \ldots, \Delta P_{n-1})$ for i=3, ..., M, we establish the following relationship:

$$\Delta P_{n-i+1} = \psi_i(P_{n-N+1}, \Delta P_{n-N+1}, \ldots, \Delta P_{n-1})$$

where $1 \leq i \leq M$.

It is observed that when N is large enough, the relationship between $P_{n-N+1}$ and $P_{n+i-1}$ becomes weaker and weaker as n and i increase. If this relationship becomes weak enough to be neglected, the above equation can be simplified as follows:

$$\Delta P_{n-i+1} = \psi_i(\Delta P_{n-N+1}, \ldots, \Delta P_{n-1})$$

where $1 \leq i \leq M$.

Rewriting the above equations in vector format yields the following:

$$\begin{bmatrix} \Delta P_n \\ \Delta P_{n+1} \\ \ldots \\ \Delta P_{n+M-1} \end{bmatrix} = \begin{bmatrix} \psi_1(\Delta P_{n-N+1}, \ldots, \Delta P_{n-1}) \\ \psi_2(\Delta P_{n-N+1}, \ldots, \Delta P_{n-1}) \\ \ldots \\ \psi_M(\Delta P_{n-N+1}, \ldots, \Delta P_{n-1}) \end{bmatrix}$$

$$= \begin{bmatrix} \psi_1 \\ \psi_2 \\ \ldots \\ \psi_M \end{bmatrix} (\Delta P_{n-N+1}, \ldots, \Delta P_{n-1})$$

Since the exact forms of functions $\psi_i$'s are unknown, with historical load data available, a feedforward neural network with proper layers may be trained to approximate such functions. As is well known, neural networks have the capability to approximate any continuous function defined on a compact support with any arbitrary small positive error. Though the actual bound for $\Delta P_k$ is not known explicitly, it is always practical to assume that all the load increments are all bounded. In other words, it is always reasonable to assume that the support of functions $\psi_i$'s is compact.

Thus, there exists a neural network that can approximate the above relationship in an arbitrary small positive error:

$$\begin{bmatrix} \Delta P_n \\ \Delta P_{n+1} \\ \dots \\ \Delta P_{n+M-1} \end{bmatrix} = NN(\Delta P_{n-N+1}, \dots, \Delta P_{n-1}; \Theta)$$

where $\Theta$ is a parameter vector that contains weights between neighboring layers, and biases for all the hidden neurons, and is to be tuned in a way that the discrepancy between the calculated values for the future times and the actual values is minimized in terms of performance index. Neural networks are trained off-line using historical load data. After the completion of neural network training and validation, they are ready for use on-line.

Figure 2:
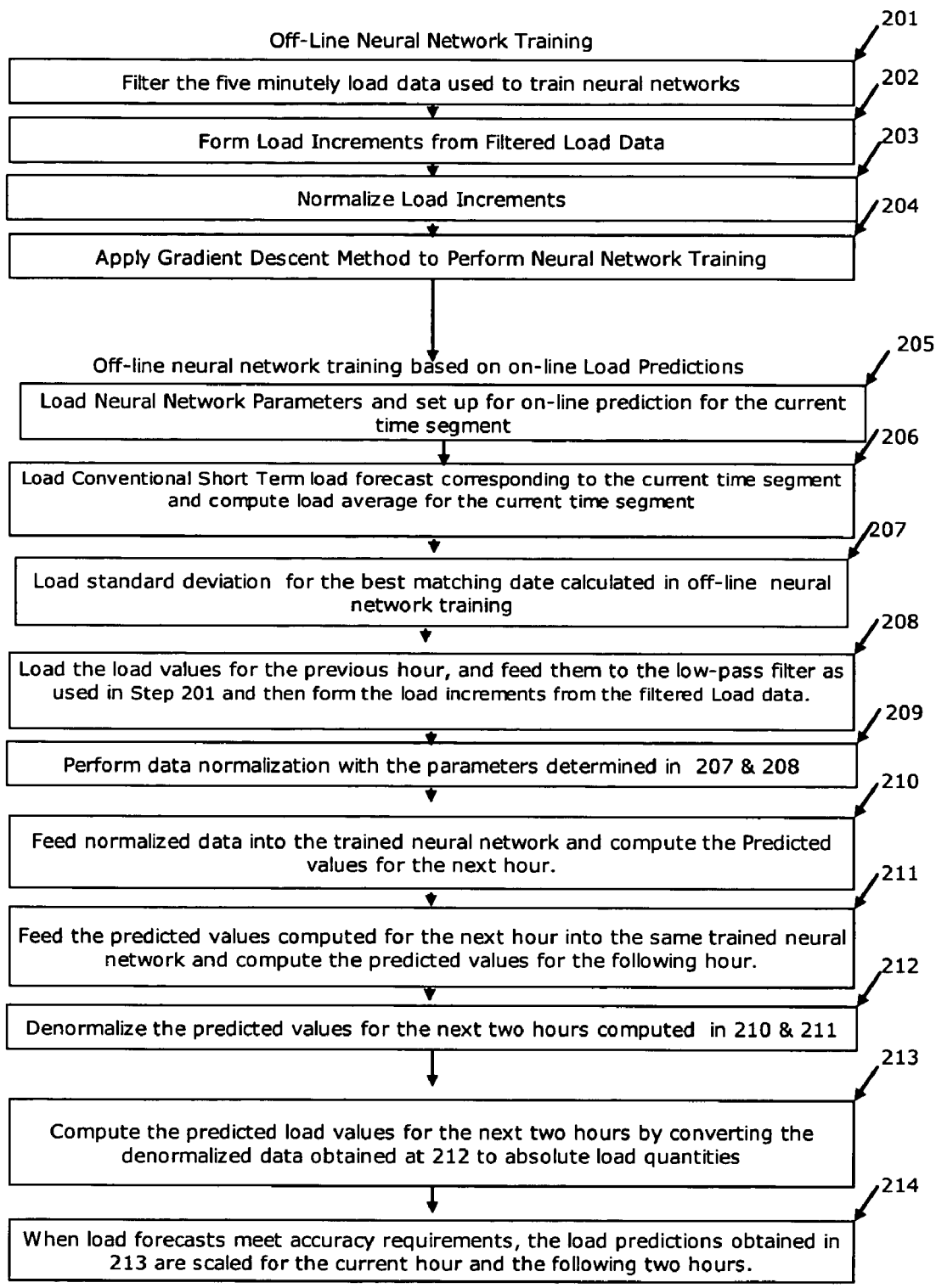
FIG. 2 is a flowchart of the training of an Off-line Neural Network.

The flow chart shown in FIG. 2 demonstrates the use of on-line load predictions to train an off-line neural network. More specifically, the process makes uses of load increments, appropriate data pre-processing and post-processing, and conventional short-term load forecast. Although the process is illustrated in an embodiment which executes a cycle every 5 minutes and in real time or nearly real time, the process may be executed in any other temporal span and frequency.

The off-line neural network training methodology is described below. In step 201, filter the five-minutely load data used to train neural networks. This filtering process retrieves historical data according to a pre-specified selection criteria. The filter can be designed as h(t) whose Laplace transfer function is specified by $$H(s) = \frac{1}{1 + \tau s}$$

where $\tau$ is designated as 30 minutes. Let $P_k^h$ denote the filtered load data. Then $$P_k^h = \frac{1}{1+\tau/T} P_{k-1}^h + \frac{\tau/T}{1+\tau/T} P_k = \frac{1}{7} P_{k-1}^h + \frac{6}{7} P_k$$

where T is 5 minutes.

In step 202, form load increments from filtered load data. Mathematically, $\Delta P_n^h = P_{n+1}^h - P_n^h$. If load data comes from different data sources, the symbol for load increments needs to identify this as well. That is, $\Delta P_{n,\Delta C_j}^h = P_{n+1,C_j}^h - P_{n,C_j}^h$ where $C_j = \{n | P_{n,C_j}^h\}$ and $\Delta C_j = \{n | P_{n,\Delta C_j}^h\}$ with the subscript j representing the index of different load data sources corresponding to respective best matching dates.

In step 203, normalize load increments. Load increments are normalized using respective mean $m\{\Delta C_j\}$ and standard deviation $\sigma\{\Delta C_j\}$ of the incremental data derived from its corresponding data source. Mathematically, $$q_n = \overline{\Delta P_{n,\Delta C_j}^h} = \frac{\Delta P_{n,\Delta C_j}^h - m\{\Delta C_j\}}{\sigma\{\Delta C_j\}}.$$

In step 204, apply the gradient descent method with the momentum term to perform neural network training using data obtained at Step 3 ahead of time before it is used. At the end of training, the following relationship is realized with optimal $\Theta^*_{off}$ (locally optimal if not globally optimal) such that $$\begin{bmatrix} \hat{q}_n^{off} \\ \hat{q}_{n+1}^{off} \\ \dots \\ \hat{q}_{n+M-1}^{off} \end{bmatrix} = NN_{off}(q_{n-N+1}, \dots q_{n-1}, ; \Theta^*_{off}).$$

Steps 1 to 4 represent the off-line neural network training. The rest steps represent the off-line neural network training based on-line load prediction.

In step 205, load neural network parameters and set up neural networks for on-line prediction for the current time segment (one of [00:05, 04:00], [04:05, 08:00], [08:05, 12:00], [12:05,16:00], [16:05, 20:00], [20:05, 24:00]).

In step 206, load conventional short-term load forecast corresponding to the current four-hour time segment. Compute the load average for the current time segment.

In step 207, load the standard deviation of the best matching date calculated in off-line neural network training.

In step 208, load the load values for the previous hour, and feed them to the low-pass filter as used in Step 201. Form the load increments from the filtered load data.

In step 209, perform data normalization with the parameters determined in Steps 207 and 208.

In step 210, feed the normalized data into the trained neural network and compute the predicted values for the next hour.

In step 211, feed the predicted values computed for the next hour into the same trained neural network. Compute the predicted values for the following hour.

In step 212, denormalize the predicted values for the next two hours computed at Steps 210 and 211.

In step 213, compute the predicted load values for the next two hours by converting the denormalized data obtained at step 212 to absolute load quantities.

In step 214, when conventional hourly (or half-hourly) short term load forecast is deemed as meeting forecast accuracy requirement, the load predictions obtained at step 213 are scaled to satisfy the hourly energy obtained from the short term load forecast for the current hour and following two hours.

When the actual load exhibits load patterns that are not used in the off-line neural network training, the off-line neural network training based on-line load prediction scheme will not be able to make accurate load predictions for the unlearned load patterns. A mechanism needs to be introduced to cope with this situation. This is where the on-line neural network training is needed.

The on-line neural network training based load prediction scheme starts with on-line neural network training. For on-line neural network training, the neural network is initialized with the parameter values obtained from off-line neural network training. The actual load data for the past two hours is used to adjust the neural network parameters so that a performance index that measures the distance in some sense between the target data and the actual output data of the neural network.

Figure 3:
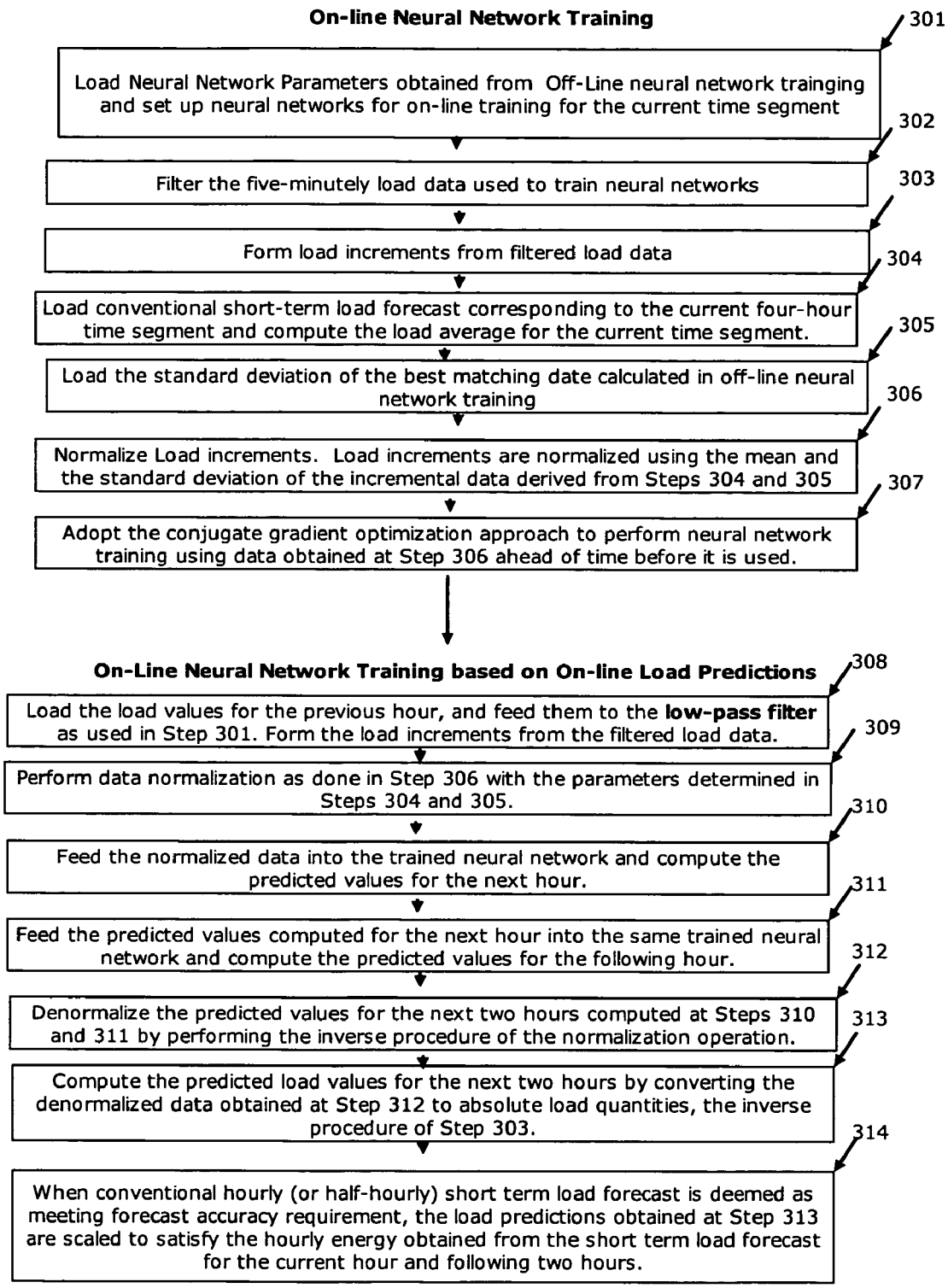
FIG. 3 is a flowchart of the training of an On-line Neural Network.

The flow chart shown in FIG. 3 demonstrates the use of on-line load predictions to train an on-line neural network. The process makes use of load increments, appropriate data pre-processing and post-processing, and conventional short-term load forecast. Although the process is illustrated in an embodiment which executes the cycle every 5 minutes and in real time or nearly real time, the process may be executed in any other temporal span and frequency.

The on-line neural network training methodology is described below. In step 301, load neural network parameters obtained from off-line neural network training and set up neural networks for on-line training for the current time segment (one of [00:05, 04:00], [04:05, 08:00], [08:05,12:00], [12:05,16:00], [16:05, 20:00], [20:05, 24:00]).

In step 302, filter the five-minutely load data used to train neural networks. This filtering process retrieves historical data according to a pre-specified selection criteria. The filter can be designed as h(t) whose Laplace transfer function is specified by $$H(s) = \frac{1}{1+\tau s}$$

where $\tau$ is designated as 30 minutes. Let $P_k^h$ denote the filtered load data. Then $$P_k^h = \frac{1}{1+\tau/T} P_{k-1}^h + \frac{\tau/T}{1+\tau/T} P_k = \frac{1}{7} P_{k-1}^h + \frac{6}{7} P_k$$

where T is 5 minutes. The load data used in on-line neural network training includes load data for the past 2 hours in 5 minute intervals.

In step 303, form load increments from filtered load data. Mathematically, $\Delta = P_n^h = P_{n+1}^h - P_n^h$.

In step 304, load conventional short-term load forecast corresponding to the current four-hour time segment and compute the load average for the current time segment.

In step 305, load the standard deviation of the best matching date calculated in off-line neural network training.

In step 306, normalize load increments. Load increments are normalized using mean m and standard deviation $\sigma$ of the incremental data derived from steps 304 and 305. Mathematically, $$q_n = \overline{\Delta P_n^h} = \frac{\Delta P_n^h - m}{\sigma}.$$

In step 307, adopt the conjugate gradient optimization approach to perform neural network training using data obtained at step 306 ahead of time before it is used. At the end of training, the following relationship is realized with optimal $\Theta^*_{on}$ (locally optimal if not globally optimal) such that $$\begin{bmatrix} \hat{q}_n^{on} \\ \hat{q}_{n+1}^{on} \\ \cdots \\ \hat{q}_{n+M-1}^{on} \end{bmatrix} = NN_{on}(q_{n-N+1}, \ldots q_{n-1}, ; \Theta^*_{on}).$$

Steps 301 to 307 represent the on-line neural network training. The remaining steps represent the on-line neural network training based on-line load prediction.

In step 308, load the load values for the previous hour, and feed them to the low-pass filter as used in step 301 and calculate the load increments from the filtered load data.

In step 309, perform data normalization as done in step 306 with the parameters determined in steps 304 and 305.

In step 310, feed the normalized data into the trained neural network and compute the predicted values for the next hour.

In step 311, feed the predicted values computed for the next hour into the same trained neural network and compute the predicted values for the following hour.

In step 312, denormalize the predicted values for the next two hours computed at steps 310 and 311 by performing the inverse procedure of the normalization operation.

In step 313, compute the predicted load values for the next two hours by converting the denormalized data obtained at step 312 to absolute load quantities.

In step 314, when conventional hourly (or half-hourly) short term load forecast is deemed as meeting forecast accuracy requirement, the load predictions obtained at step 313 are scaled to satisfy the hourly energy obtained from the short term load forecast for the current hour and following two hours. When the load predictions made by the off-line neural network training based on-line prediction scheme and the on-line neural network training based prediction scheme are made available, a mechanism is introduced to finalize the load predictions by combining the prediction results obtained with two different approaches. This mechanism is presented below.

Figure 4:
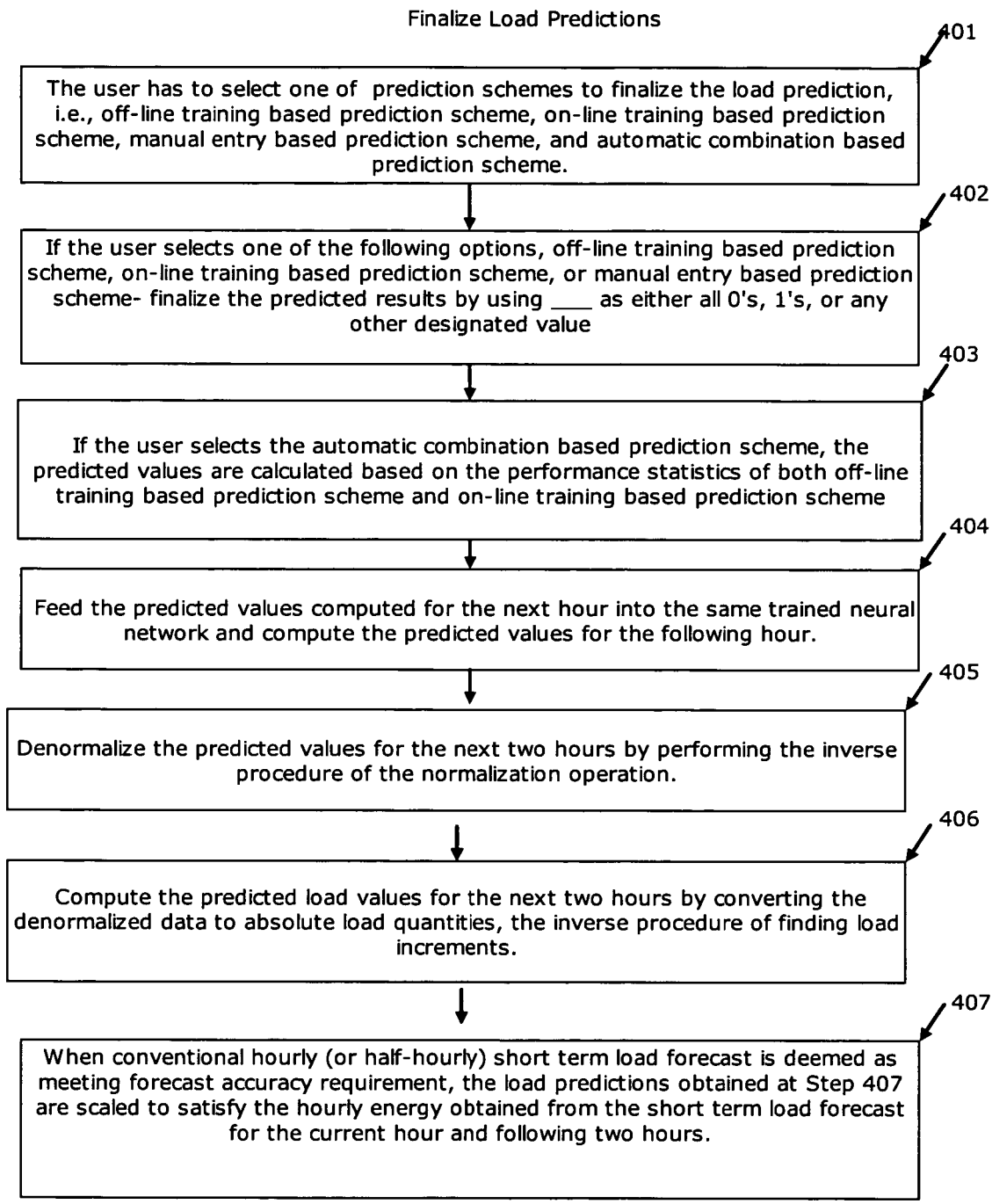
FIG. 4 is a flowchart of the finalization of predicted load values.

The flow chart shown in FIG. 4 demonstrates the use of on-line load predictions from trained on-line and off-line neural networks to finalize load predictions. The process makes a combination of the prediction results obtained with both the off-line and on-line training based prediction schemes. Although the process is illustrated in an embodiment which executes the cycle every 5 minutes and in real time or nearly real time, the process may be executed in any other temporal span and frequency.

In step 401, the user selects one of the prediction schemes to finalize the load prediction, i.e., off-line training based prediction scheme, on-line training based prediction scheme, manual entry based prediction scheme, and automatic combination based prediction scheme.

In step 402, if the user selects one of the following options, off-line training based prediction scheme, on-line training based prediction scheme, or manual entry based prediction scheme, then the finalized predictions are given by the following equation:

$$\begin{bmatrix} \hat{q}_n \\ \hat{q}_{n+1} \\ \vdots \\ \hat{q}_{n+M-1} \end{bmatrix} = Diag\{\lambda_1, \lambda_2, \ldots, \lambda_N\} NN_{off}(q_{n-N+1}, \ldots q_{n-1}, ; \Theta^*_{off}) +$$

$$(I - Diag\{\lambda_1, \lambda_2, \ldots, \lambda_N\}) NN_{off}(q_{n-N+1}, \ldots q_{n-1}, ; \Theta^*_{off})$$

where $Diag\{\lambda_1, \lambda_2, \ldots, \lambda_N\}$ is a diagonal matrix, I a unitary matrix. When the off-line training based prediction scheme is selected, all these $\lambda_i$'s are 1; when the on-line training based prediction scheme is selected, all these $\lambda_i$'s are 0; when the manual entry based prediction scheme is selected, all these $\lambda_i$'s are manually entered values.

In step 403, if the user selects the automatic combination based prediction scheme, the $\lambda_i$'s are calculated based on the performance statistics of both off-line training based prediction scheme and on-line training based prediction scheme. Each $\lambda_i$ is calculated as follows:

For the off-line training based prediction scheme, we maintain a counter with initial value 0. For each 5 minute cyclic execution, compare the off-line training based prediction results to the actual load data, if any of the prediction results is within the desired prediction accuracy of the corresponding actual load, then the counter is incremented by 1; do the similar thing for the on-line training based prediction results. These two counters are maintained continuously.

For the current five minute interval, check the values in these two counters. Let us denote the value in the counter for the off-line training based prediction scheme by $N_{off}^i$, and the value in the counter for the on-line training based prediction scheme by $N_{on}^i$. Then $\lambda_i$ is given by $$\lambda_i = \frac{N_{off}^i}{N_{off}^i + N_{on}^i}.$$

The statistics $N_{off}^i$ and $N_{on}^i$ are maintained on a per time segment (six different four-hour time segments per day) basis.

When $N_{off}^i$ and $N_{on}^i$ are large enough, if for each time interval, at least one of the off-line training based prediction scheme and the on-line training based prediction scheme performs acceptably, $\lambda_i$ represents the probability that the off-line training based prediction scheme performs acceptably for the ith 5-minute time interval of the prediction horizon. The results represent the expectation of the neural network based prediction results. When for significantly number of time intervals, neither the off-line training based prediction scheme nor the on-line training based prediction scheme performs acceptably, when $\lambda_i$ is still calculated using the above equation, there is a significant non-zero probability that the combined results will deviate beyond acceptable ranges.

Then finalize the prediction results by using the following equation:

$$\begin{bmatrix} \hat{q}_n \\ \hat{q}_{n+1} \\ \vdots \\ \hat{q}_{n+M-1} \end{bmatrix} = Diag\{\lambda_1, \lambda_2, \ldots, \lambda_N\} NN_{off}(q_{n-N+1}, \ldots q_{n-1}, ; \Theta_{off}^*) +$$

$$(I - Diag\{\lambda_1, \lambda_2, \ldots, \lambda_N\}) NN_{off}(q_{n-N+1}, \ldots q_{n-1}, ; \Theta_{off}^*)$$

In step 404, feed the predicted values computed for the next hour into the same trained neural network. Compute the predicted values for the following hour.

In step 405, denormalize the predicted values for the next two hours by performing the inverse procedure of the normalization operation.

In step 406, compute the predicted load values for the next two hours by converting the denormalized data to absolute load quantities, the inverse procedure of finding load increments.

In step 407, when conventional hourly (or half-hourly) short term load forecast is deemed as meeting forecast accuracy requirement, the load predictions obtained at step 407 are scaled to satisfy the hourly energy obtained from the short term load forecast for the current hour and following two hours.

While the inventive method and system have been particularly shown and described with reference to an embodiment hereof, it should be understood by those skilled in the art that various changes in form and detail may be made therein without departing from the spirit and scope of the invention.

What is claimed is:

1. A method of energy management and short term load prediction in a power system using an off-line neural network and an on-line neural network and a load database having load data captured from the field, each neural network comprising a plurality of neurons to predict a short term load demand on the power system, comprising:

(a) implementing a first prediction scheme that uses off-line neural network training to output first on-line load predictions, the first prediction scheme comprising:
      receiving by an off-line neural network historical load data from a load database;
      training the off-line neural network with the historical load data, resulting in a trained off-line neural network with tuned parameter values $\Theta$ containing weights and biases;
      loading short term load forecast data into the trained off-line neural network;
      generating first on-line load predictions by the trained off-line neural network;
   (b) implementing a second prediction scheme that uses on-line neural network training to output second on-line load predictions, the second prediction scheme comprising:
      initializing parameter values of an on-line neural network with the tuned parameter values $\Theta$ from the trained off line neural network;
      receiving by the on-line neural network current load data for a current time segment from the load database;
      adjusting the parameter values of the on-line neural network based on the current load data;
      training the on-line neural network with the current load data, resulting in a trained on-line neural network;
      loading short term load forecast data into the trained on-line neural network;
      generating second on-line load predictions by the trained on-line neural network;
   (c) calculating performance statistics of the first and second prediction schemes wherein the performance statistics are represented by counters, comprising:
      comparing the first on-line load predictions with actual load values and incrementing a first counter if the difference between the first on-line load predictions and the actual load values are within a predetermined range;
      comparing the second on-line load predictions with actual load values and incrementing a second counter if the difference between the second on-line load predictions and the actual load values are within a predetermined range;
   (d) selecting either the first or second on-line load predictions as final predicted load values based on a decision algorithm using the calculated performance statistics; and
   (e) scheduling energy generation of the power system based on the final predicted load values.

2. The method of claim 1, further comprising selecting the first prediction scheme to use in calculating the final predicted load values if the value in the first counter is greater than the value in the second counter; and selecting the second prediction scheme to use in calculating the final predicted load values if the value in the second counter is greater than the value in the first counter.

3. The method of claim 1 wherein the step of training the off-line neural network comprises the step of calculating load increments between load data, and using the load increments to train the off-line neural network.

4. The method of claim 3, wherein the step of training the off-line neural network comprises the step of normalizing the load increments and using the normalized load increments to train the off-line neural network.

5. The method of claim 4, wherein the step of using the load increments to train the off-line neural network comprises the step of using the load increments to calculate the first on-line load predictions.

6. The method of claim 4, wherein the step of normalizing the load increments comprises the step of using a standard deviation from a best matching date calculated in off-line neural network training.

7. The method of claim 1 wherein the step of training the on-line neural network comprises the step of calculating load increments between load data, and using the load increments to train the on-line neural network.

8. The method of claim 7, wherein the step of training the on-line neural network comprises the step of normalizing the load increments and using the normalized load increments to train the on-line neural network.

9. The method of claim 8, wherein the step of using the load increments to train the on-line neural network comprises the step of using the load increments to calculate the third set of on-line predicted load values.

10. The method of claim 8, wherein the step of normalizing the load increments comprises the step of using a standard deviation from a best matching date calculated in on-line neural network training.

11. The method of claim 10 further comprising the step of using gradient optimization to train the on-line neural network.

12. The method of claim 6 further comprising the step of using gradient optimization to train the off line neural network.

13. The method of claim 2 further comprising generating an accuracy probability as a ratio of the first counter over the combined first and second counters.

14. The method of claim 13 further comprising the step of comparing the generated probabilities and selecting the load prediction scheme with the highest probability.

15. A system for energy management and short term load prediction in a power system using an off line neural network and an on-line neural network and load data captured from the field, each neural network comprising a plurality of neurons to predict a short term load demand on the power system, comprising:
   a processor for executing an energy management application;
   an off-line neural network and an on-line neural network, each in communication with the processor;
   a load database for storing current and historical load data accessible by the processor, the off-line neural network and the on-line neural network;
   wherein said energy management application causes the processor to perform the steps of:
   (a) implementing a first prediction scheme that uses off-line neural network training to output first on-line load predictions, the first prediction scheme comprising:
      receiving by an off-line neural network historical load data from a load database;
      training the off-line neural network with the historical load data, resulting in a trained off-line neural network with tuned parameter values Θ containing weights and biases;
      loading short term load forecast data into the trained off-line neural network;
      generating first on-line load predictions by the trained off-line neural network;
   (b) implementing a second prediction scheme that uses on-line neural network training to output second on-line load predictions, the second prediction scheme comprising:
      initializing parameter values of an on-line neural network with the tuned parameter values Θ from the trained off-line neural network;
      receiving by the on-line neural network current load data for a current time segment from the load database;
      adjusting the parameter values of the on-line neural network based on the current load data;
      training the on-line neural network with the current load data, resulting in a trained on-line neural network;
      loading short term load forecast data into the trained on-line neural network;
      generating second on-line load predictions by the trained on-line neural network;
   (c) calculating performance statistics of the first and second prediction schemes, wherein the performance statistics are represented by counters, comprising:
      comparing the first on-line load predictions with actual load values and incrementing a first counter if the difference between the first on-line load predictions and the actual load values are within a predetermined range;
      comparing the second on-line load predictions with actual load values and incrementing a second counter if the difference between the second on-line load predictions and the actual load values are within a predetermined range;
   (d) selecting either the first or second on-line load predictions as final predicted load values based on a decision algorithm using the calculated performance statistics; and
   (e) scheduling energy generation of the power system based on the final predicted load values.

16. The system of claim 15, wherein the energy management application causes the processor to perform the further step of selecting the first prediction scheme to use in calculating the final predicted load values if the value in the first counter is greater than the value in the second counter; and selecting the second prediction scheme to use in calculating the final predicted load values if the value in the second counter is greater than the value in the first counter.

17. The system of claim 16, further comprising generating an accuracy probability as a ratio of the first counter over the combined first and second counters.

18. The system of claim 15, wherein the step of training the off line neural network and the on-line neural network comprises the step of calculating load increments between load data, and using the load increments to train the off line neural network and on-line neural network.

19. The system of claim 18, wherein the step of training the off-line neural network and on-line neural network comprises the step of normalizing the load increments and using the normalized load increments to train the off-line neural network and on-line neural network.

20. The system of claim 19, wherein the step of normalizing the load increments comprises the step of using a standard deviation from a best matching date calculated in off-line neural network training.

21. A computer-readable medium for use in energy management and short term load prediction in a power system using load data captured from the field, said computer-readable medium having stored thereon instructions which when executed by a processor, cause the processor to perform the steps of:
   (a) implementing a first prediction scheme that uses off-line neural network training to output first on-line load predictions, the first prediction scheme comprising:
      receiving by an off-line neural network historical load data from a load database;
      training the off-line neural network with the historical load data, resulting in a trained off-line neural network with tuned parameter values $\Theta$ containing weights and biases;
      loading short term load forecast data into the trained off-line neural network;
      generating first on-line load predictions by the trained off-line neural network;
   (b) implementing a second prediction scheme that uses on-line neural network training to output second on-line load predictions, the second prediction scheme comprising:
      initializing parameter values of an on-line neural network with the tuned parameter values $\Theta$ from the trained off-line neural network;
      receiving by the on-line neural network current load data for a current time segment from the load database;
      adjusting the parameter values of the on-line neural network based on the current load data;
      training the on-line neural network with the current load data, resulting in a trained on-line neural network;
      loading short term load forecast data into the trained on-line neural network;
      generating second on-line load predictions by the trained on-line neural network;
   (c) calculating performance statistics of the first and second prediction schemes, wherein the performance statistics are represented by counters, comprising:
      comparing the first on-line load predictions with actual load values and incrementing a first counter if the difference between the first on-line load predictions and the actual load values are within a predetermined range;
      comparing the second on-line load predictions with actual load values and incrementing a second counter if the difference between the second on-line load predictions and the actual load values are within a predetermined range;
   (d) selecting either the first or second on-line load predictions as final predicted load values based on a decision algorithm using the calculated performance statistics; and
   (e) scheduling energy generation of the power system based on the final predicted load values.

* * * * *

UNITED STATES PATENT AND TRADEMARK OFFICE
CERTIFICATE OF CORRECTION

PATENT NO.         : 7,552,100 B2
APPLICATION NO. : 11/495482
DATED                 : June 23, 2009
INVENTOR(S)       : Dingguo Chen Page 1 of 1

It is certified that error appears in the above-identified patent and that said Letters Patent is hereby corrected as shown below:

On the Title Page under Related U.S. Application Data Item (60), "60/703,803, filed on Jul. 29" should read --60/703,083, filed on Jul. 28--.

In column 1, line 9, "60/703,803, filed on Jul. 29" should read --60/703,083, filed on Jul. 28--; and in column 1, line 10 "60/703,801" should read --60/703,081--.

Signed and Sealed this

Twenty-fifth Day of August, 2009

David J. Kappos
*Director of the United States Patent and Trademark Office*